Patented Nov. 6, 1934

1,979,449

UNITED STATES PATENT OFFICE 1,979,449

PREPARATION OF ORGANIC ACIDS

Gilbert B. Carpenter, Wilmington, Del., assignor, by mesne assignments, to E. I. du Pont de Nemours & Company, Wilmington, Del., a corporation of Delaware No Drawing. Application February 28, 1931, Serial No. 519,236

5 Claims. (Cl. 260—116)

This invention relates to a process for the formation of organic compounds and particularly to the preparation of monocarboxylic acids by the interaction of aliphatic alcohols and carbon monoxide in the presence of a catalyst.

It is known that organic acids and esters can be prepared by the interaction, in the vapor or liquid phase, of organic compounds with the oxides of carbon. For example, it has been shown that by the condensation of methyl alcohol with carbon monoxide in the presence of a suitable catalyst acetic acid, methyl acetate, and methyl formate may be prepared in proportions which are governed by the particular operating conditions. Acids have likewise been prepared from methane and carbon monoxide, from carbon monoxide and water vapor, and from ethers and carbon monoxide. Investigators have experienced considerable difficulty in their attempts to find, for these reactions, a catalyst which under given operating conditions would produce a good yield of the acid or other compound desired. Some of the catalysts which have been suggested include the hydrogenating and hydrating catalysts alone or in combination, metal acetate catalysts which split off acetic acid under 450° C., and acid catalysts, such as phosphoric acid and its acid salts.

There are numerous disadvantages in the employment of the before-mentioned catalysts, however. For instance, when the hydrating and hydrogenating catalysts are employed, particularly if acetic acid is the desired end product, but low yields of that acid result. With the metal acetate catalysts which decompose and split off acetic acid, frequent reactivation is required which renders their use uneconomical from the commercial standpoint. When the liquid acid catalysts are utilized, difficulties in supporting them and maintaining their initial activity are encountered.

An object of this invention is to provide a process for the preparation of higher molecular weight organic compounds thru the introduction of carbon monoxide into the lower molecular weight organic compounds. A further object of this invention is to provide a process for the preparation of monocarboxylic acids by the condensation of aliphatic alcohols with carbon oxides in the presence of a catalyst. Another object of this invention is to provide a process for the preparation of acids having the structural formulæ— $C_nH_{2n+1}COOH$—from alcohols having the structural formulæ—$C_nH_{2n+1}OH$—by subjecting the alcohols to the action of carbon monoxide in the presence of gaseous adsorbents. A still further object of this invention is to provide a process for the preparation of acetic acid by the interaction of methanol and carbon monoxide in the presence of catalysts of an adsorbing nature. Other objects will hereinafter appear.

I have found that monocarboxylic acids can be prepared by the interaction of monohydroxy aliphatic alcohols in the presence of carbon monoxide by passing the alcohols in the vapor phase together with carbon monoxide over certain forms of carbon. The forms of carbon which have given good yields of the acid and its ester include the activated charcoals such as 75 minute charcoal or those having a lower degree of activity.

The alcohol-carbon monoxide reactions which can be accelerated by the above described catalysts may be expressed as follows.

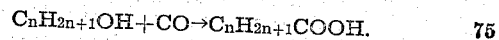
$$C_nH_{2n+1}OH + CO \rightarrow C_nH_{2n+1}COOH.$$

In accordance with the particular operating conditions, it will be found that, in some instances, the acid may not be formed directly in the free state, but may be produced as an ester by condensation of the acid formed with the particular alcohol used in the process, as indicated below:

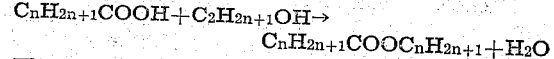
$$C_nH_{2n+1}COOH + C_2H_{2n+1}OH \rightarrow$$
$$C_nH_{2n+1}COOC_nH_{2n+1} + H_2O$$

The alcohol used may be replaced, if desired, wholly or partly by the corresponding alkyl ethers of the alcohol, such as dimethyl ether, diethyl ether, or the mixed alkyl ethers, the alkyl esters, or other compounds containing one or more hydrolyzable alkoxy groups.

The synthesis can generally be efficiently carried out under the following operating conditions. The pressure may vary from approximately 25 atmospheres to 900 atmospheres or higher with the preferable operating range in the neighborhood of 350–700 atmospheres. The temperature within the reaction zone is quite critical as it determines to a large extent the product obtained. For example, when the methanol-carbon monoxide reaction is conducted at temperatures below 300° C. a low yield of methyl acetate will be obtained. While, on the other hand, at temperatures above 300° C. the yield of methyl acetate will increase with a corresponding decrease in the proportion of the parasitic products.

The carbon monoxide used may be obtained from various commercial sources, such, for example, as from water gas, producer gas, coke oven gas, and the like, but to obtain products of the highest degree of purity it is preferable to remove from such commercial gases the objectionable constituents such as sulfur compounds, metal carbonyls, etc.

The presence of inert gases in the alcohol-carbon monoxide mixture is sometimes desirable. Nitrogen, for instance, has little deleterious effect on the reaction or yield and, in fact, may be advantageously used in order to aid in the temperature control and to prevent too great a conversion of the alcohol and carbon monoxide on one pass through the conversion apparatus. Other strictly inert gases will usually act similarly to nitrogen. It is, of course, understood that instead of introducing methanol itself into the reaction chamber substances or mixtures of substances which decompose to form alcohols or esters may be employed, but generally I prefer to introduce methanol directly into the gas stream leading to the converter.

My process can be conveniently carried out by passing purified carbon monoxide into methanol preferably containing water, maintained at such a temperature that the issuing gases will have the requisite proportion of methanol, carbon monoxide and water vapor. I have found that a gaseous composition, containing an excess of carbon monoxide over the methanol vapor, will give a good yield of acetic acid and ester on one pass through a converter containing my adsorbing catalyst,—the temperature of the reaction chamber being maintained at approximately 300° C. and the pressure held in the neighborhood of 350 atmospheres.

The carbon catalysts which I prefer to employ for the preparation of acetic acid are preferably used as the sole catalytic agent. The minute charcoal, for instance when formed into pills of 8–14 mesh, or screened to that size, is sufficiently active for producing the condensation of the alcohol with carbon monoxide to acetic acid without the necessity of having present any other catalytic agent. The presence of a small amount of impurity with the active carbon, say up to 10% by weight of the carbon, does not ordinarily appear to appreciably inhibit the reaction. This catalyst may be promoted by the presence, for example, of up to, say, 5 to 10% of a promoter such as the oxides of titanium, aluminum, silicon, etc. In no instance, however, should there be present such a large amount of the promoter that the reacting gases have no points of contact with the carbon per se. It should be understood, however, that promotion of the carbon is not essential to render the charcoal or activated carbon a catalyst for this reaction and it is usually advantageous to use the carbon catalyst in an unpromoted condition.

Activated charcoal used in accord with my invention as a catalyst is not to be confused with charcoal when used as a support. In the latter case the interstices of the charcoal are utilized to increase the surface area, presented to the reactants, of the particular catalysts spread thereover. The charcoal surface is thereby covered and the resulting catalytic effect is due to the catalyst supported thereon. On the other hand, when using charcoal as a catalyst its surface area is not covered with another material and its catalytic activity is due to the carbon particles and/or the configuration of these particles exposed directly to the reactants.

It should be likewise understood that a promoted charcoal catalyst is entirely different in its catalytic activity from a compound supported on charcoal. The latter, as was noted above, is merely a covering of the charcoal with a compound to be used as the catalyst. The former, however, would constitute, for example, an intimate commingling of the charcoal with the promoting compound with the result that the surface area of the charcoal and the promoter, exposed to the reactants, would be substantially proportional to the percentage composition by weight of the catalyst, assuming for the sake of this illustration that the charcoal and the promoter had equal weight per unit surface area exposed. This type of catalyst might well be called a mixed catalyst.

Not only can methanol be catalyzed in the presence of carbon monoxide and my catalyst to acetic acid or the condensation product of the acetic acid with methanol, i. e. methyl acetate, but the higher alcohols, such as ethyl alcohol, propyl alcohol, butyl alcohol, and even the higher molecular weight alcohols, such for example as hexyl alcohol or octyl alcohol, may be similarly converted into an acid having correspondingly one more carbon atom than the alcohol treated. In fact, my process and catalyst may be employed with any of the monohydric alcohols, providing these alcohols volatilize without decomposition. When converting the higher aliphatic alcohols, some of which are not water soluble, and particularly if water is desired in the reaction, it is preferable to introduce the alcohol and water into the carbon monoxide as a vapor or spray. Any other suitable procedure may be employed, however, for intimately commingling the vapors of the alcohol and water with the oxide of carbon. When preparing products from the higher molecular weight compounds I may utilize in lieu of the alcohol the ether or ester thereof, the use of which will modify, to some extent, the type of product obtained.

I will now describe a specific embodiment of my process, but it will be understood that the details therein given and the compounds employed, either as reactants or catalysts, in no way restrict the scope of this invention, but merely illustrate one manner in which my process may be carried out.

A gas mixture consisting of 90% carbon monoxide, 5% hydrogen, and 5% methanol is passed, while under a pressure of 700 atmospheres and a temperature of 350° C., over an activated charcoal catalyst disposed in a conversion chamber adapted for the carrying out of gaseous exothermic reactions. The condensate obtained by cooling the resultant gas contains free acetic acid, methyl acetate, and some unconverted methanol.

The apparatus, which may be employed for conducting these reactions, may be of any conventional type and preferably one in which the temperature of the exothermic reaction can be readily controlled at the optimum value. Owing to the corrosive action of acetic acid, the interior of the converter and apparatus leading therefrom should preferably be protected. This may be accomplished by using glass or glass-lined apparatus or by plating the inner surfaces thereof with chromium or silver or using for the construction of this equipment acid risisting high alloy steels containing, for example, high molybdenum, cobalt, tungsten, chromium, manganese, or nickel content.

From a consideration of the above specification it will be realized that any process in which a carbon oxide is combined with an organic compound giving a product containing a negative radical of an aliphatic acid, and particularly those in which monohydric alcohols are converted to monocarboxylic acids, will come within the scope of this invention when such reactions are accelerated in the presence of promoted or unpromoted carbon as a catalyst.

I claim:

1. A process for the preparation of aliphatic organic acids which comprises contacting a compound selected from the group consisting of the monohydroxy aliphatic alcohols, the alkyl ethers and the alkyl esters, with an activated charcoal catalyst in the presence of carbon monoxide at a temperature above approximately 300° C.

2. A process for the preparation of aliphatic organic acids which comprises contacting a monohydroxy aliphatic alcohol which is not substantially decomposed when vaporized, with a catalyst consisting of activated charcoal in the presence of carbon monoxide at a temperature above 300° C.

3. A process for the preparation of acetic acid which comprises contacting methanol with an activated charcoal catalyst in the presence of carbon monoxide at a temperature above 300° C.

4. A process for the preparation of acetic acid which comprises passing methanol and carbon monoxide at a pressure of 700 atmospheres and a temperature of 350° C. over an activated charcoal catalyst.

5. A process for the preparation of aliphatic organic acids which comprises contacting a saturated monohydroxy aliphatic alcohol which is not substantially decomposed when vaporized and carbon monoxide with an activated charcoal catalyst at a temperature of approximately 300° C. and a pressure of from 25 to 900 atmospheres.

GILBERT B. CARPENTER.